United States Patent [19]
Newell

[11] Patent Number: 6,050,023
[45] Date of Patent: Apr. 18, 2000

[54] NON-IMPALING FISHING LURE BAITHOLDING DEVICE

[76] Inventor: Larry K. Newell, 895 Mendy La., Raymond, Miss. 39154

[21] Appl. No.: 09/149,321

[22] Filed: Sep. 8, 1998

[51] Int. Cl.[7] .................................................. A01K 83/06
[52] U.S. Cl. .......................... 43/44.4; 43/44.2; 43/44.6; 43/44.8
[58] Field of Search .................... 43/17, 54.1, 4, 43/4.5, 44.2, 44.4, 44.6, 44.8, 43.1, 43.12, 43.11, 43.14, 43.15, 41, 41.2, 44.9, 44.91, 44.92, 44.87, 44.88; D22/147, 148

[56] References Cited

U.S. PATENT DOCUMENTS

| | | | |
|---|---|---|---|
| 2,588,526 | 3/1952 | Hoage | 43/44.8 |
| 2,754,613 | 7/1956 | Rogers et al. | 43/44.2 |
| 2,767,505 | 10/1956 | Noyd | 43/44.2 |
| 2,795,885 | 6/1957 | Imberti | 43/44.2 |
| 2,882,639 | 4/1959 | McGarraghy et al. | 43/44.2 |
| 2,895,254 | 7/1959 | Krauss | 43/44.4 |
| 2,940,208 | 6/1960 | Oswald | 43/44.4 |
| 2,962,833 | 12/1960 | Stinson | 43/44.2 |
| 3,022,572 | 2/1962 | Kwisnek | 43/44.2 |
| 3,040,467 | 6/1962 | Norton | 43/44.4 |
| 3,105,319 | 10/1963 | Whalen | 43/44.2 |
| 3,156,066 | 11/1964 | Munyer | 43/44.8 |
| 3,197,911 | 8/1965 | Rolfsness et al. | 43/44.2 |
| 3,197,913 | 8/1965 | Rainey | 43/44.8 |
| 3,200,532 | 8/1965 | Walton | 43/44.8 |
| 3,289,346 | 12/1966 | Ehling | 43/44.6 |
| 3,387,402 | 6/1968 | Mays | 43/44.8 |
| 3,400,483 | 9/1968 | Temple | 43/44.2 |
| 3,415,004 | 12/1968 | Whalen | 43/44.2 |
| 3,435,553 | 4/1969 | Conley | 43/44.2 |
| 3,521,395 | 7/1970 | Klemkowsji, Jr. | 43/44.2 |
| 3,543,434 | 12/1970 | Hauck | 43/44.2 |
| 3,587,189 | 6/1971 | Kopicko | 43/44.4 |
| 3,645,031 | 2/1972 | Egles | 43/44.2 |
| 3,667,150 | 6/1972 | Hearne | 43/44.6 |
| 3,729,851 | 5/1973 | Garcia | 43/44.8 |
| 3,738,048 | 6/1973 | Duchscher | 43/44.2 |
| 3,738,049 | 6/1973 | Garza | 43/44.4 |
| 3,760,526 | 9/1973 | Hicks | 43/44.4 |
| 3,760,529 | 9/1973 | Hicks | 43/44.4 |
| 3,774,337 | 11/1973 | Desbois | 43/44.6 |
| 3,881,270 | 5/1975 | Olcott | 43/17 |
| 3,893,255 | 7/1975 | Hicks | 43/44.4 |
| 3,914,896 | 10/1975 | Sahagian | 43/44.6 |
| 3,958,355 | 5/1976 | Findon | 43/44.2 |
| 4,010,568 | 3/1977 | Mays | 43/44.4 |
| 4,221,069 | 9/1980 | Esses | 43/44.2 |
| 4,312,089 | 1/1982 | Taylor | 43/44.92 |
| 4,471,558 | 9/1984 | Garcia | 43/44.4 |
| 4,785,571 | 11/1988 | Beck | 43/44.4 |
| 5,319,875 | 6/1994 | Brandolino | 43/42.06 |
| 5,611,168 | 3/1997 | Schultz et al. | 43/44.6 |

*Primary Examiner*—Michael J. Carone
*Assistant Examiner*—Fredrick T. French, III

[57] ABSTRACT

Disclosed herein is a baitholding device having a design which simulates a bait predator. The baitholder comprises a pair of complementary clasps, each of said clasps having an interior portion and an exterior portion. Each clasp further having an arcuate portion comprising a plurality of elongated bait engaging members having a plurality of raised cleats along an inner surface of each elongated bait engaging member for surrounding and holding bait without impaling said bait. The clasps also have a handle portion extending from each arcuate portion. Complementary hinge member portions extend from the interior portion of each clasp. Each hinge member portion has an aperture therein. The baitholding device further comprises a biasing member aligned along said hinge member portions and between the interior portion of each clasp. The biasing member urging the handle portions to diverge and urging the arcuate portions to converge. The complementary clasps are joined together by a hinge, the hinge is formed such that the complementary hinge member portions of each clasp are overlapped and the apertures of each hinge member portion are aligned. A fish hook is inserted through the aligned apertures of the hinge member portions forming a hinge shaft upon which the hinge pivots. The handle portions when pressed together cause the arcuate portions to open allowing bait to be placed therebetween. When the handle portions are released, the biasing member maintains the arcuate portions in a closed position. Bait is retained between the converging arcuate portions of each clasp without the bait being impaled.

14 Claims, 8 Drawing Sheets

NON-IMPALING FISHING LURE BAITHOLDING DEVICE

BACKGROUND—FIELD OF INVENTION

This invention relates to fishhooks used while baitfishing, whereby bait is attached to hooks, more specifically, wherein a clamplike baitholding device is attached to said hook.

BACKGROUND—DESCRIPTION OF PRIOR ART

Some things never change. They are the same as when first dreamed of. Usually, some change is eventually required to make a device or process meet Man's everchanging needs. Take fishing, for example. More specifically, fishing whereby some type of live, dead, processed, or artificial bait is attached to one of various types of fishhooks, known as baitfishing. This type of fishing has evolved to meet Man's need of not only catching fish, but also to provide some of life's greatest enjoyment. There's only one thing, somebody has to bait the hook, a process or means requiring the bait to be stabbed or pierced in order to attach it to fishhook.

This process or method of attaching one's bait to a fishhook wherein said bait is stabbed or pierced with a barb or pointed end of said hook, is the "weak link in the chain". The process of attaching bait to a fishhook, is to me, minor surgery. It's repulsive, distasteful, wasteful, dangerous, and in extreme situations it can be life or limb threatening. If one is blind or handicapped, then technically the method is nearly impossible. Kids don't understand why they have to injure or kill their bait to be able to enjoy catching fish. I've never understood why a perfectly live bait is intentionally stabbed with the barb end of a fishhook and shocked, killed outright, or compromised. Live bait, such as, but not limited to, minnows, crawfish, crickets, worms, shrimp, or any bait that must be kept alive, is during the process of being attached to a fishhook compromised or killed using the present-day method of stabbing the bait with the barb end of the hook. Just the thought of intentionally stabbing a minnow, much less a big juicy earthworm, also known as a night-crawler, is enough to keep some from fishing altogether. The present stabbing method is distasteful. You have to stick flesh that bleeds and has in some cases, infected guts that come squirting out. It's wasteful. Live bait is expensive and using the present stab method wastes or kills the bait by stabbing it to attach it to a hook. It takes too long. Take for instance when fishing for crappie, and two poles are being used, using the stab method. Suddenly, one pole catches a fish, and while a new bait is being stabbed, using minor surgery, another fish gets on the other pole. There is a quicker way of attaching bait while using two or more poles. You wouldn't miss fish while wasting time killing your live bait with the hook if only there were a better way of attaching the bait. The present-day method of attaching bait by stabbing with the barb end of a hook is dangerous. The hook sometimes stabs a hand or finger rather than the bait. If one is a diabetic or has a compromised immune system, the process of stabbing bait can be life or limb threatening. Many bacteria and viruses need water to survive. The present-day method of stabbing bait to attach it to a fishhook; can; be a means of injecting one of the germs into the user during stabbing the bait with the hook's barbed end. This stab method is badly flawed if salmonella, hepatitis, e-coli, diphtheria, malaria, or germs of various water-born diseases are present on the bait or on the hook. I can find no alternative for sale to this method of attaching bait to a fishhook.

There needs to be a means or method of attaching bait to a fishhook wherein the bait is not intentionally stabbed or pierced with the barb end of the hook, but is held securely to the hook using a new method or means. I think it's time for a rethinking or re-engineering fishing with bait using a barbed fishhook. The process has a serious flaw and will become obsolete when a better, safer, quicker, cleaner, easier, and less prohibitive means or method of attaching bait to a hook is invented. All the prior art searched revealed no alternative such as the present one and does show art that includes hooks with clamps, but none like the present invention. The present-day method of stabbing one's bait is used in all the prior art and bait is held by the barbed end of a hook. Artificial bait is stabbed, damaged and sometimes ruined using this method. There needs to be a method of attaching artificial bait without intentionally stabbing or piercing it with the barb end of the hook. A new invention or means used by all fishermen or women would be described as contemporary, quicker, cleaner, new designs, and superior to the old stab method now in use.

As stated, it's hard to break old habits. The slightest change whereby a method or process changes for the better is so hard to invent, much-less get everyone to use. The present-day method of attaching bait to a fishhook has been around for a long time and will be replaced with a new way when someone invents it. It's time to use a new method of attaching bait to a fishhook that's safer, less repulsive, and more enjoyable. We've been using the same old way of attaching bait to a fishhook for too long and it's time for a change. I believe the present invention will make the conventional method of baiting a fishhook obsolete, but not forgotten.

OBJECTS AND ADVANTAGES

Accordingly, besides the objects and advantages of present-day fishhooks used to hold live, dead, processed, or artificial bait, several objects and advantages of the present invention are:

(a) to provide a method of attaching live, dead, processed, or artificial bait to a fishhook without intentionally stabbing or piercing bait with pointed or barbed end of said hook;

(b) to provide a method of attaching bait to a fishhook which, decreases the level of shock, decreases the likelihood of bait dieing from being attached to hook, and which doesn't compromise the bait's ability to catch or attract fish;

(c) to provide a method of fishing whereby live, dead, processed, or artificial bait is attached to a fishhook wherein said fishhook has a clamplike baitholding device or a plurality of said baitholding devices attached to itself and thereby attaching bait to said hook;

(d) to provide various sizes, shapes, colors, textures, materials used to manufacture, styles or designs which would include but not be limited to, ornamented hook or clamp with a skirt, spinner, or other design feature;

(e) to provide a means for holding bait in said baitholding clamp from slight to firm depending on the application, size of cleats, or strength of urging by clamp spring or clamp urge tab (see figs.);

(f) to provide a method of attaching artificial bait such as but not limited to artificial worms, lizards, or any artificial bait that has to be attached to a fishhook;

(g) to provide a method of attaching artificial bait to a fishhook whereby said bait is not intentionally stabbed or pierced with barb end of said hook, therefore decreasing damage done to bait such as ripping, tearing, or ruining bait;

(h) to provide a method of just clamping bait to a hook, which increases the chances of attaching bait to a hook without accidentally stabbing self;

(i) to provide a method of baiting one's fishhook employing the present invention, thereby increasing enjoyment, especially for those fisher's repulsed or even prohibited by the currently used method of stabbing bait with barb end of hook;

(j) to provide a method more sanitary than the conventional method of attaching live, dead, processed, or artificial bait to a fishhook wherein said method does not intentionally stab or pierce said bait with barb end of hook, bait is just clamped on;

(k) to provide a method of attaching bait in most cases, more securely than the present method of stabbing bait with a hook and to accomplish this by simply clamping bait to the hook;

(l) to provide new design features having but not limited to, trot-line application;

(m) to provide the present invention attached to fishhook wherein said baitholding device is attached to said hook in manufacturing process or by user;

(n) to provide a method of attaching bait to a fishhook, whereby said bait is simply clamped to said hook, especially benefitting the blind or handicapped, partial paralysis stroke patients, or kids who are unable to, inconvenienced by, or prohibited by the present-day method of attaching bait to a fishhook.

DRAWING FIGURES

In the drawings, closely related figures have the same Arabic numeral, but different alphabetic suffixes.

26 fishhook with clamp-like baitholding device attached
28 fishhook of any size, shape, or design style
30 not shown 32 plurality of cleats on inner surface of curved, finger-like extensions
34 live or dead minnow attached to a fishhook without stabbing said minnow with barbed end of said hook
38 baitclamp attached to proximal or upper-eye end of hook shank
40 artificial worm or any artificial bait
42 weedless hook with weed guard
44 fishhook with a plurality of clamp-like baitholding devices attached to a plurality of sites on bait's body
46 live or dead earthworm
48 cricket hook or any small type hook application
50 a cricket or any small live, dead, or processed bait
52 a crawfish or any bait live, dead, or processed
54 treble hook
56 a colored skirt or any ornamenting design feature
58 clamp spring
60 clamp spring shaft or pin spring shaft
62 not shown
64 live or dead minnow
66 maximum barb exposure clamp side design
68 beetle-spin artificial bait with clamp-like baitholding device attached to hook proximal end
70 clamp attached to hook of beetle-spin
72 clamp sides as spoilers, wings, spoons, or hydrodynamic wings
74 clamp side mount
76 clamp side
78 hook as spring shaft
80 curved finger-like extension with cleats on said extension's inner surface
82 spider-like clamp design feature
84 snake-head like clamp design feature
86 fish-head like clamp design feature
88 urging tab cut from and rising from inner surface of clamp
90 dead or processed bait
92 clamp-like baitholding device attached to fishhook wherein said clamp does not have a spring between clamp sides to urge clamp sides together, but employs a tab arising from one of clamp's sides

DESCRIPTIONS—FIGS. 1 TO 24D

Figure 1A:
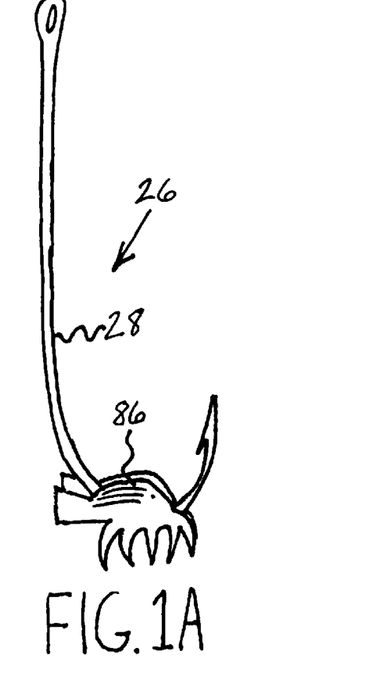
FIGS. 1A–1C illustrate side, front, and overhead views of a fishhook and clamplike baitholding device attached to said hook.
Figure 1B:
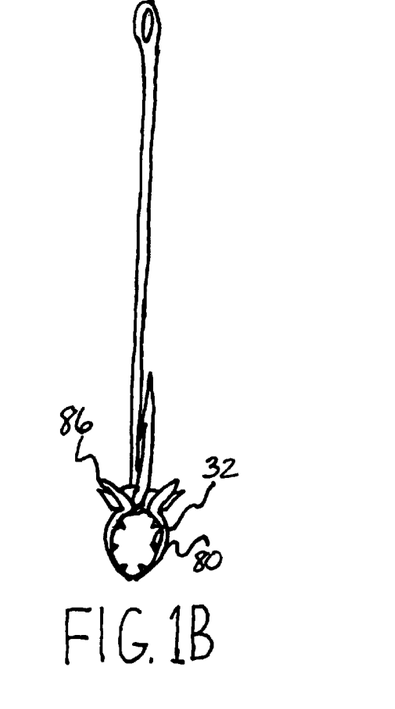
Figure 1C:
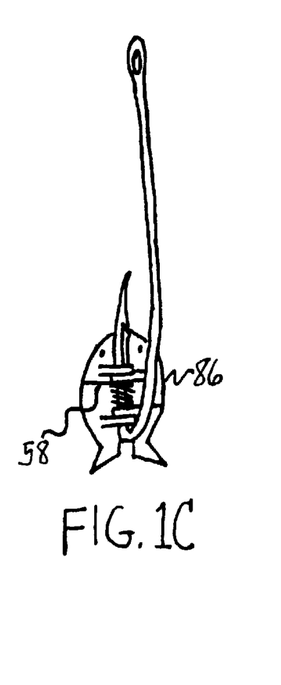
Figure 22:
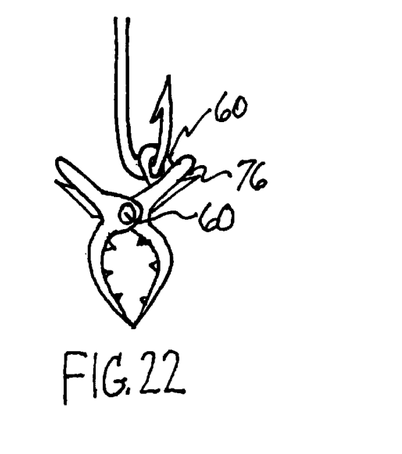
FIG. 22 illustrates clamp in FIG. 19A wherein a fishhook is attached to mount on clamp side.

FIGS. 1A to 1C illustrate one embodiment of the present invention. a fishook with a clamp-like baitholding device 26 attached to said hook is depicted in FIGS. 1A to 1C. Fishhook 28 in FIG. 1A has attached to itself baitholding clamp 86. Fishhook preferably made of rustproof metal and barbed on pointed end. Hook size, number of barbs, and style such as but not limited to, a weedless hook design, vary. Clamp 86 preferably comprised of lightweight, strong and preferrably rustproof plastic or metal or both. FIG. 1C illustrates a spring 58 positioned between clamp 86's sides. Clamp spring 58 urges clamp to be in closed or clamped position with said spring preferrably made of metal and rustproof. Spring 58 can vary in size, sharp, strength, and have a pin-shaft or use the fishhook as shaft. Spring size and strength determines clamp's grip ranging from slight to firm. Spring 58 isn't necessary if clamp is designed like clamp shown in FIGS. 24A to 24D wherein a tab 88 urges clamp sides closed. FIG. 1B is an axillary view of FIG. 1A. Also shown in FIG. 1B are curved finger-like extensions 80 and a plurality of cleats on each of said extensions. Cleats 32 are shown protruding toward inner clamp surface in FIG. 1B. Size of said cleats 32 vary depending on desired application. Clamp extensions 80 have 2–3 cleats 32. Said clamp 86 is positioned on hook in FIGS. 1A thru 1C wherein fishhook passes through center of spring, but can be attached to said hook as depicted in FIG. 22 wherein said clamp is mounted or attached to mount 60 on inner surface of clamp's side.

Figure 4:
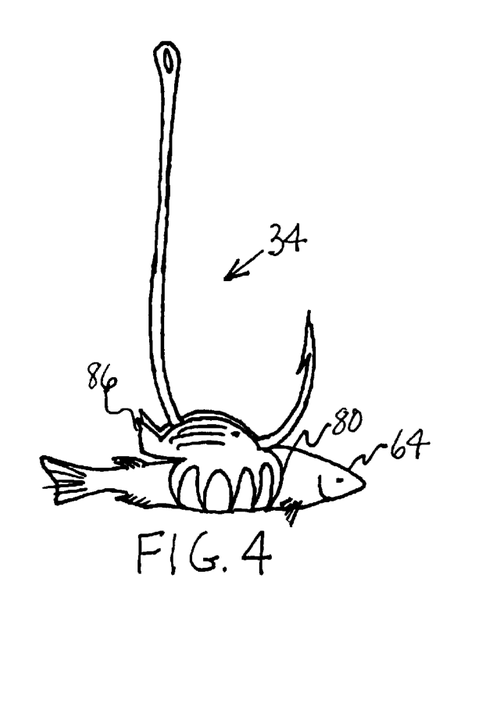
FIG. 4 illustrates a minnow attached to hook wherein minnow is attached to said baitholding device without being intentionally stabbed or pierced by barb end of said hook.

FIG. 4 illustrates clamp 86 attaching a live or dead minnow 64 to said clamp wherein bait is simply clamped on and said bait is not stabbed or pierced with barb end of hook. The said minnow is held in said clamp in a natural position wherein clamp is attached to said minnow's body center or just behind center thereby allowing minnow to remain alive and swim while held in said clamp extensions.

Figure 5A:
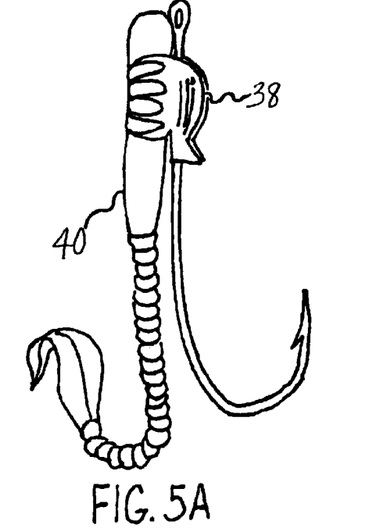
FIG. 5A shows baitholding clamp holding an artificial worm or artificial snake bait wherein said bait is attached to said hook without stabbing hook barbed end into bait.
Figure 5B:
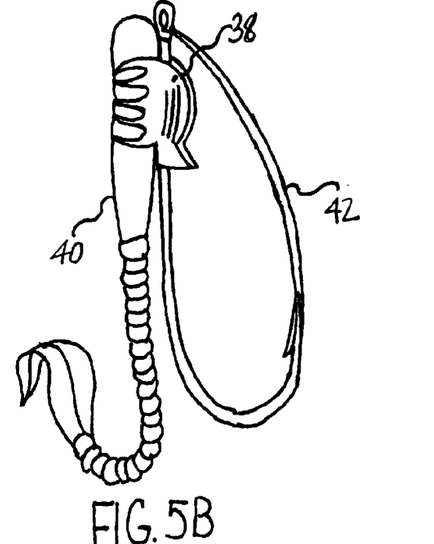
FIG. 5B shows said baitholding clamp attaching an artificial worm or snake to a Weedless hook, notice clamp position.

FIG. 5A illustrates an artificial bait application 40. Clamp 38 is shown positioned on hook's proximal, upper or eye end of shank. bait 40 is held in clamp 38 without stabbing or piercing bait 40 with barb end of hook, it's just clamped on. To remove, attach, or re-place bait 40, just simply squeeze clamp sides together thereby opening clamp sides and removing or replacing said artificial bait without damaging said bait. Not shown in FIG. 5A are cleats 32 on clamp extension's inner surface, wherein said cleats 32. can be larger if desired while using artificial bait. Said hook in FIG. 5A can vary as depicted in FIG. 5B wherein a weedless hook 42 is shown holding said artificial bait 40.

Figure 6:
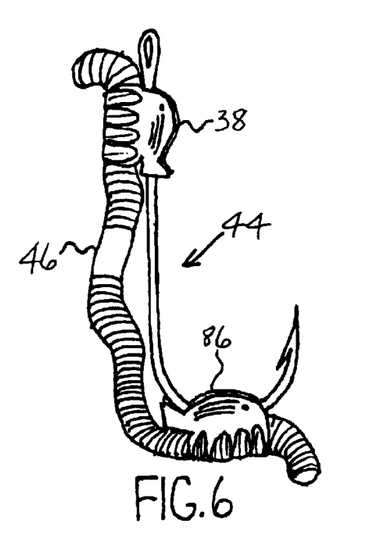
FIG. 6 illustrates a fishhook with a plurality of said bait-holding clamps wherein an earthworm is shown attached to hook on more than one site on said worm.

FIG. 6 illustrates a fishhook wherein a plurality of clamps 44 are shown for clamping an earthworm bait 46 to said fishhook. Said bait here is attached at more than one site on said worm's body and hook barbed end does not intentionally stab said worm bait, bait is just simply clamped to hook.

Figures 7A, 7B:
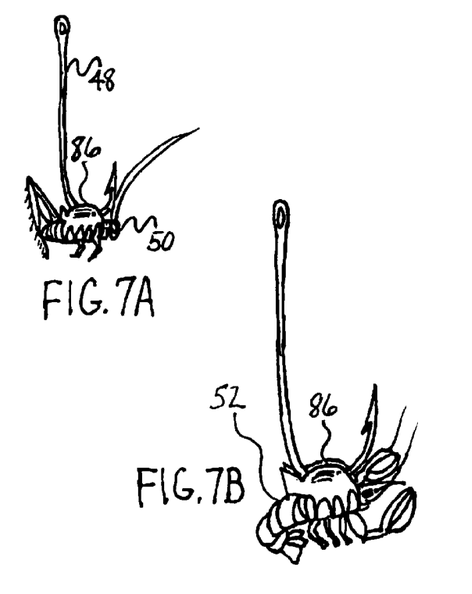
FIG. 7A illustrates a cricket clamped to a cricket hook wherein said hook does not stab bait with barb end of hook; see FIG. 23A for cricket hook application also.
FIG. 7B shows a crawfish clamped to hook wherein said hook does not stab bait with barb end of hook.

FIG. 7A illustrates a crickett bait 50 shown here held by but not limited to a crickett sized hook 48. Baitholding clamp is positioned on said hook attaching said crickett to hook without stabbing or piercing crickett with barb end of said hook. Ditto for FIG. 7B except bait in 7B depicted is a crawfish bait 52. Said crawfish bait is held in clamp by its thorax area being simply clamped on to and the barb end of hook is not stabbed into crawfish.

Figure 8:
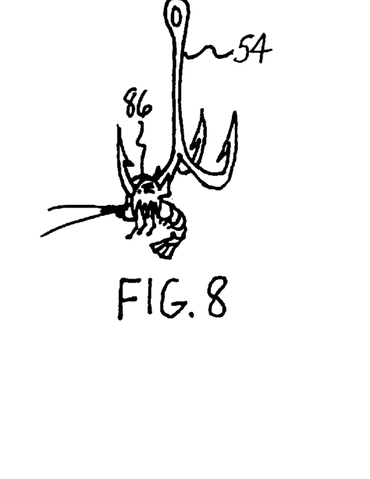
FIG. 8 illustrates a shrimp clamped to a treble hook, or possibly a crawfish is clamped on depending on fresh or salt water application.

FIG. 8 illustrates a treble type hook 54 wherein attached bait-holding clamp is clamped to but not limited to a live shrimp bait. Again, the said hook's barbed end does not stab or pierce said shrimp with barb end of hook, the shrimp is simply clamped on.

Figure 9:
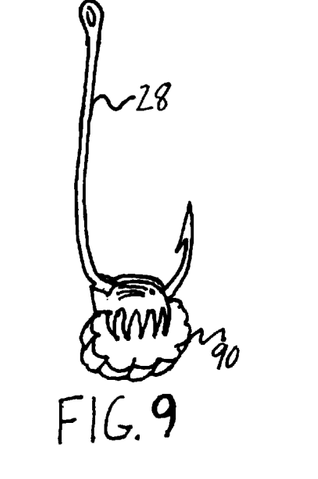
FIG. 9 shows dead or processed bait in clamp on but not limited to, a trotline hook; larger cleats on clamp's extensions for dead or processed bait are preferrable design feature not shown here.

FIG. 9 shows dead bait or processed bait 90 in clamp, wherein clamp would preferrably have larger cleats 32 since said bait is dead and or processed and cleats larger for firmer hold.

Figure 10:
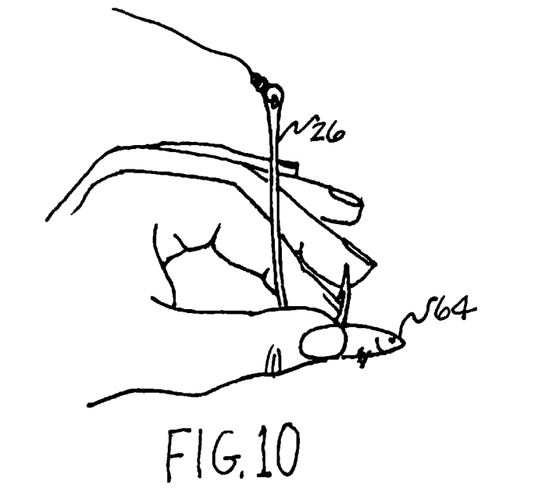
FIG. 10 illustrates the present invention showing a hand holding a minnow bait wherein clamp holding said bait is not shown, but is being squeezed between thumb and index finger for engaging or removing the minnow.

FIG. 10 illustrates the present invention in one of its embodiments wherein the thumb and index finger of one hand simply squeezes clamp sides together to remove or replace here a minnow. Notice said minnow is not stabbed or pierced with barb end of hook, it's just simply clamped on.

Figure 11:
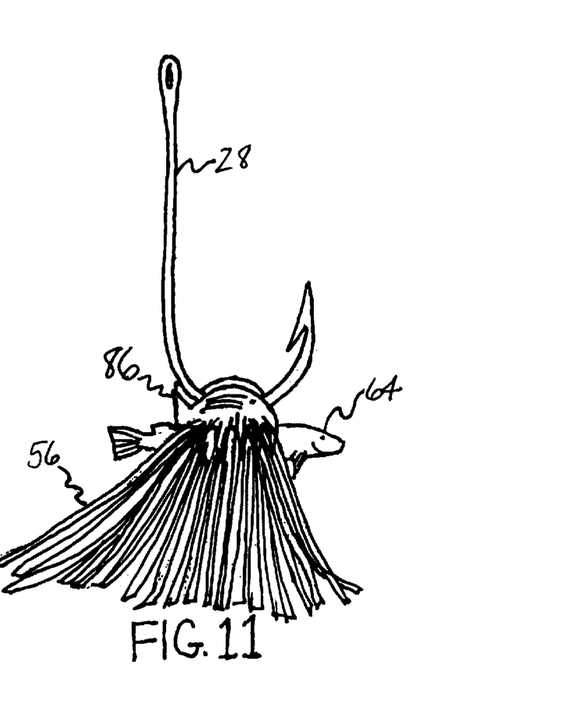
FIG. 11 shows a skirt design feature added to present invention.

FIG. 11 illustrates adding a design feature such as but not limited to a skirt 56, wherein style, position, and color of added feature may vary. Clamp 86 is shown, but clamp design can vary.

Figure 12:
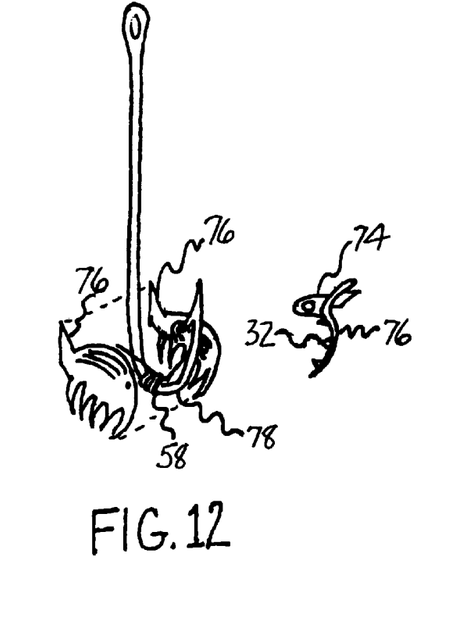
FIG. 12 illustrates front and axillary views of but not limited to, a fish-shape design clamp, clamp mounts, and spring between clamp sides mounted to a fishhook.

FIG. 12 illustrates sides of baitholder separated showing spring 58, cleats 32, and clamp mount 74 on inner surface of side 76. Also shown is hook 78 passing through spring 58. serving as shaft 78 for said spring 58.

Figure 13A:
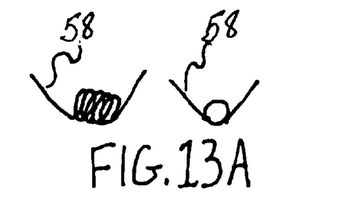
FIG. 13A shows said spring in FIG. 12
Figure 13B:
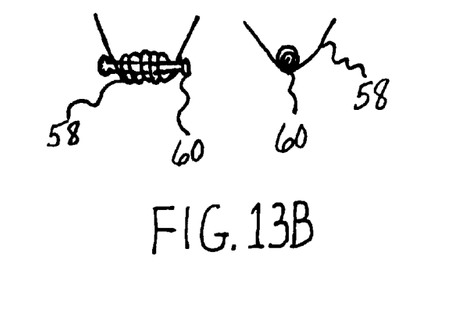
FIG. 13B illustrates said spring in FIG. 13A wherein a pin shaft passes through the center of spring.
Figure 13C:
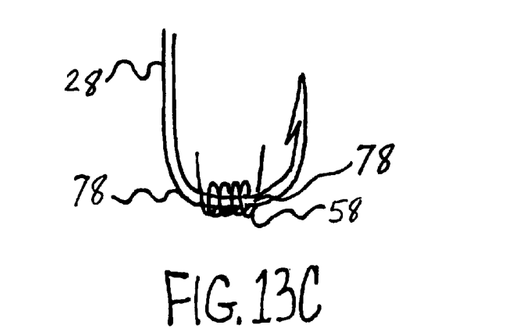
FIG. 13C illustrates an application wherein hook passes through said spring in FIG. 13A wherein this illustration the clamp sides are removed showing spring with hook as shaft.
Figure 14A:
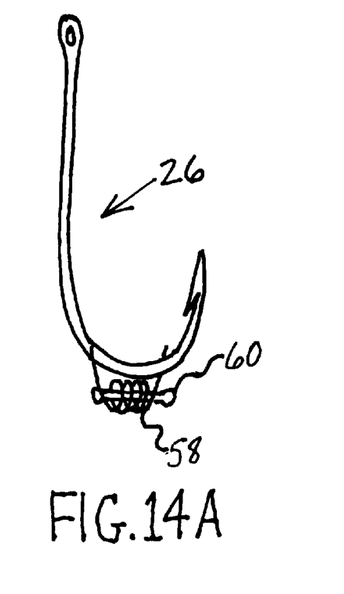
FIG. 14A illustrates said spring in FIG. 13A being positioned under a hook wherein a pin serves as spring's shaft; clamp sides not shown in this illustration.
Figure 14B:
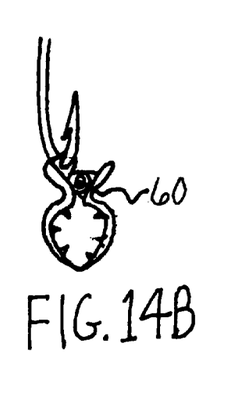
FIG. 14B illustrates a fishhook attaching to side of baitholding clamp wherein said hook is not passing through spring and said spring using pin shaft depicted in FIG. 13B.

FIG. 13A thru 13C illustrate spring 58 and two spring shaft designs: FIG. 13B depicts pin-shaft 60, FIG. 13C shows hook 28 as shaft. FIG. 13B shows spring shaft 60 as a pin-shaft passing through spring center; FIG. 14A illustrates said shaft 60 in said spring 58 under fishhook wherein clamp sides 76 aren't seen. FIG.14B is an axillary view of present invention wherein shaft 60 is shown and hook can be mounted to clamp's inner surface in manufacturing process or said hook can be attached to side of clamp by user.

Figures 15, 16:
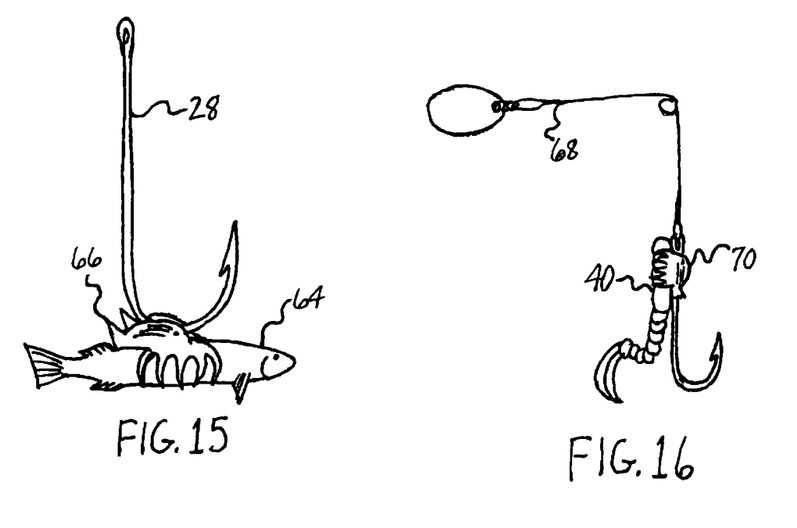
FIG. 15 illustrates a minnow in clamp under fishhook wherein said clamp incorporates a design feature allowing barb end of hook to be exposed more by positioning clamp sides further back.
FIG. 16 illustrates a beetle spin artificial bait incorporating a baitholding clamp on proximal or upper shank end of hook on beetle-spin wherein bait is not stabbed by barb end of hook and can be any artificial bait used on a beetle-spin.

FIG. 15 illustrates but is not limited to, a crappie hook 28 with baitholding clamp 66. Said clamp 66 is shown here illustrating how position of upper part of clamp side can allow more of hook's barb end to be exposed. Said clamp design 66 holds bait 64 under hook in same position, but said clamp 66's sides are further from barb end.

FIG. 16 illustrates beetle-spin 68 wherein said beetle-spin has attached to its hook, a baitholding clamp 70. Said clamp 70 is shown attaching an artificial worm, grub, or other various bait 40. Bait 40 can be removed, attached, or replaced by squeezing clamp's sides together thereby opening clamp. Notice said artificial bait attached to beetle-spin is not stabbed or pierced with barbed end of hook.

Figure 17:
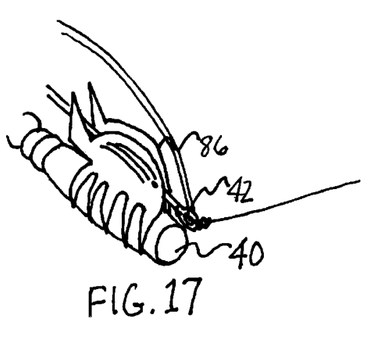
FIG. 17 illustrates an artificial bait such as but not limited to, a worm wherein said bait is clamped to hook using the present invention and said bait is being pulled by fishing line.
Figure 18:
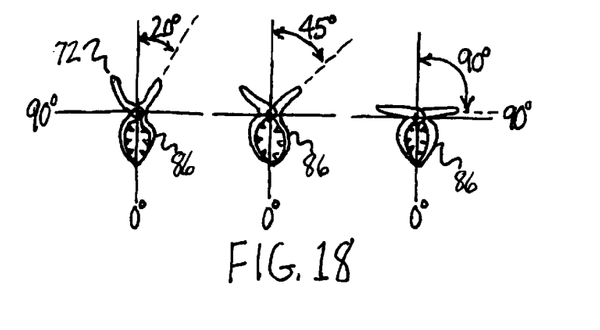
FIG. 18 illustrates said clamp in FIG. 17 showing how varying the angle of the said clamp's sides is possible which varies the hydrodynamic characteristics of said bait in FIG. 17, such as dive, rise, retrieve straight, or zig-zag.
Figure 19A:
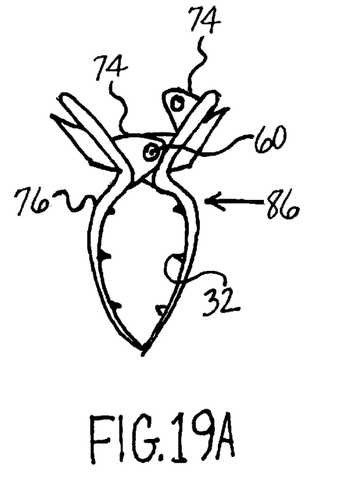
FIG. 19A illustrates an axillary view of said baitholding clamp showing an extra mount on clampside's inner surface for attaching hook to clamp either by user or manufacturing process.
Figure 19B:
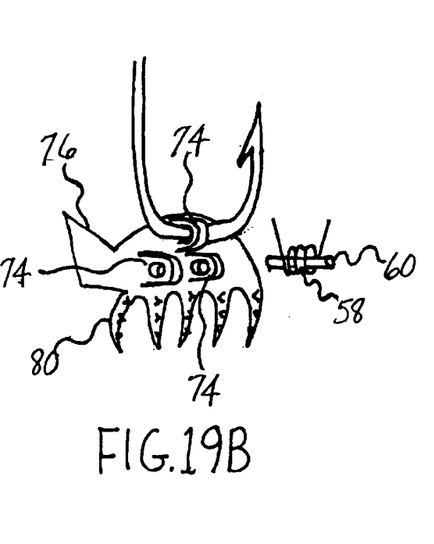
FIG. 19B illustrates fishhook attaching to one of clamp's sides depicted in FIG. 19A showing also a pin shaft and spring.
Figure 20:
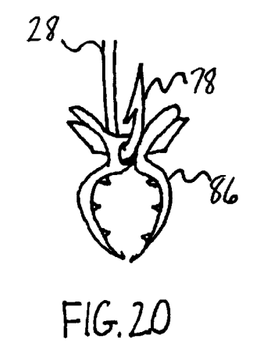
FIG. 20 shows fishhook passing through center of clamp and serving as shaft for clamp spring.
Figure 21:
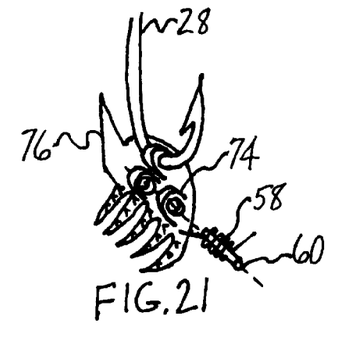
FIG. 21 shows a frontal view of FIG. 19B.

FIG. 17 is a view of FIG. 5B being retrieved wherein clamp sides influence hydrodynamic characteristics and can cause the said bait to dive, rise, or move in a straight pattern when retrieved. FIG.18 illustrates different angles clamp sides in FIG. 17 are angled to give user desired hydrodynamic characteristics such as dive, rise, or retrieve in a straight pattern depending on clamp side 72's angle FIGS. 19A, 19B, 21, and 22 illustrate baitholding clamp design wherein hook is attached to said clamp in manufacturing process or by user. FIG. 19A shows mounts 74, wherein said hook attachment is positioned on inner surface of clamp side. FIG. 19B removes a side in order to reveal inner surface of said clamp. Notice hook attached to said clamp mount 74 in FIG. 19B. In FIG. 20, fishhook passes through center of clamp rather than being side mounted as in FIG. 22 wherein said hook attaches to side of said clamp, once again if hook mounted on side of clamp as in FIG. 22, then clamp can be incorporated to hook by user or manufacturing process, thereby allowing user to add or replace clamp to hook.

Figure 23A:
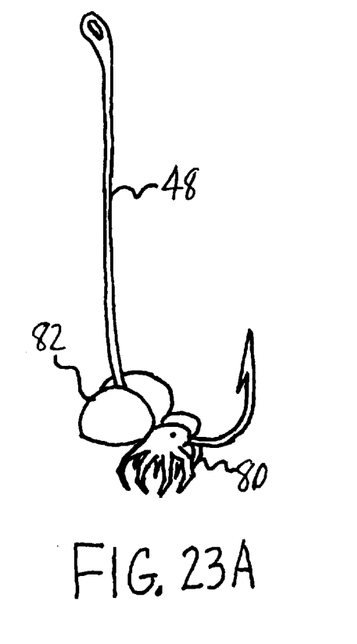
FIG. 23A illustrates a fish lure design simulating a spider wherein said spider design has clamp-like baitholding device characteristics, holding a bait similar to FIG. 7A with bait not shown in spider's curved finger-like extensions.

FIG. 23A illustrates a spider-like clamp 82 design is used and wherein bait is clamped to spider's legs which are curved finger-like extensions 80 simulating a spider's legs and said extensions 80 have raised cleats on their inner surfaces. Bait is not shown in FIG. 23A, but can be a crickett, worm, or any live or dead bait. Shown in FIG. 23A is a smaller hook application.

Figure 23B:
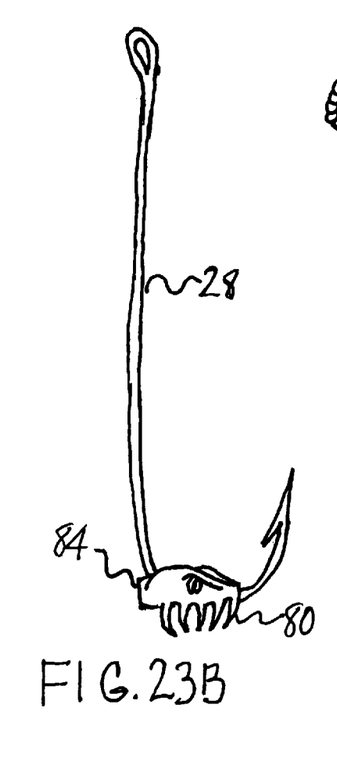
FIG. 23B illustrates a fish lure design, here simulating the head of a snake wherein clamp sides have said curved finger-like extensions for holding bait without stabbing said bait with barb end of hook.
Figure 23C:
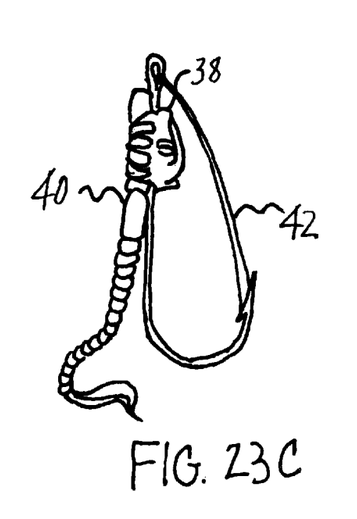
FIG. 23C illustrates a weedless hook attached to snakehead clamp.
Figure 24A:
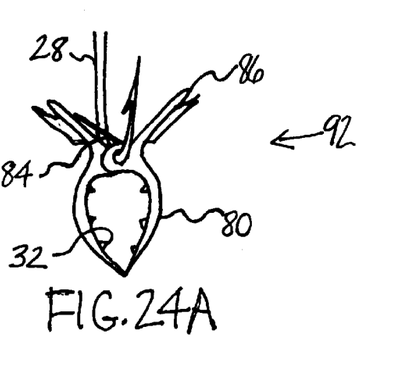
FIGS. 24A to 24D illustrate said clamp without a spring between its sides; here a tab rises from clamp side urging sides together.
Figure 24B:
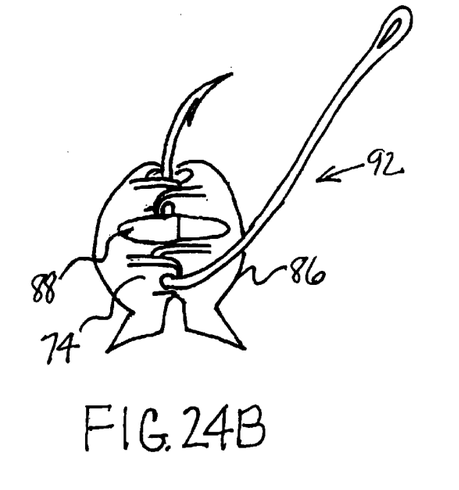
Figure 24C:
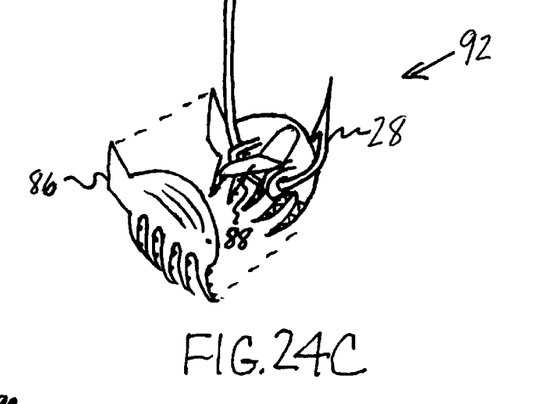
Figure 24D:
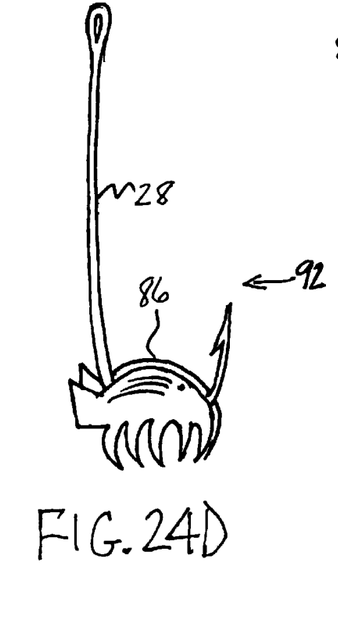

FIG. 23B is a design feature wherein said design is depicting a snake's head as clamp sides. Curved finger-like extensions with cleats on their inner surfaces grasp bait just like clamp 86. The only difference is the design feature of a real snake head and the desired application. FIG. 23C is just like FIG. 23B except a weedless hook rather than a non-weedless hook is used. Notice bait 40 in FIG. 23C is not stabbed or pierced with hook, it's just simply clamped on. This application would require larger cleats 32 to hold bait 40 firmly.

FIGS. 24A thru 24D illustrate a clamp-like baitholding device, wherein said clamp sides are urged to be closed or clamped together by an urge tab 88. This type of clamp design does not employ a clamp spring. The urge tab 88 rises from one of said clamp's sides and is contacting opposing side urging opposing side to close. Notice hook passes under said urge tab 88 and passes through clamp mounts 74. This clamp should be made of metal or plastic and preferrably rustproof and can incorporate all design features mentioned in any fig.

SUMMARY, RAMIFICATIONS, AND SCOPE

Accordingly, the reader will see that the method of baiting one's fishhook and the means of attaining said method are herein illustrated as a novel solution to the problem of baiting one's hook.

The novelty in that, a fishhook was originally designed to "catch fish" and once hooked, hold on to them. The hook does it's job well. The only problem is, a barbed fishhook wasn't designed to incorporate bait. My novel invention gives fishhooks a new way of incorporating bait. What makes my invention novel is the fact that bait is not stabbed or pierced with the barb end of fishhook, it's just simply clamped to hook. That's the method and to attain this method, a means or device is added to a fishhook's flawed design, wherein said means or device is a clamp-like baitholding device.

I guarantee that if one uses what's for sale in every store that sells fishhooks, you can not find or buy to use a baitfishing hook, wherein the bait is not intentionally stabbed or pierced with the said hook's barbed end. We keep using what's for sale from the fishing supply companys. We buy the right size hook for the type of fishing we're doing. We get fresh, live minnows or live worms or cricketts. We start fishing and right away a need to invent hits the fisherman or woman. "I wish someone would invent a better method of attaching bait to a fishhook", one says to themself as they stab their bait. Hopefully, with a little luck, the bait will not feel a thing if one is able to do the minor surgery required to bait a hook "right". Well the method is flawed and needs to be redesigned wherein bait is not stabbed with hook in order to attach itself to hook. My hook with attached baitholding clamp is an answer to the problem for anyone who has ever had to attach a live bait to a fishhook. My novel idea will allow kids, blind or handicapped people, experienced fishermen or non-experienced fishermen to enjoy this method of catching fish. The bait is just quickly, easily, and more safely attached to hook. Just squeeze said clamp with two fingers and remove, attach, or replace bait. This method can attach live, dead, processed, or artificial bait to a fishhook without stabbing the bait with the barbed end of the hook. This method of attaching bait to a fishhook without impaling bait with hook requires new thought.

The means of attaining this method is simply any fresh or salt water fishhook, of any type, of any shape, and of any size can have attached to itself, a clamp-like baitholding device wherein bait is clamped to fishhook, rather than the present method of stabbing bait with barbed end of hook for purposes of attaching said bait. Clamp is simple, consisting of two opposing sides, wherein said sides are urged to close or clamp together. This urge force can be from a spring between clamp sides, an urge tab between clamp sides, or any other means not included here of urging clamp sides to close or clamp sides together. Application or type fish being sought will determine size and design of hook and clamp. Said clamp can incorporate live, dead, processed, or artificial bait to fishhook by simply squeezing clamp sides together, thereby opening clamp sides. No more stabbing bait with barb end of hook for attaching bait to hook. Clamp device can be attached to a single hook, a treble hook, weedless hook, or any hook used to baitfish. Different design features incorporate natural characteristics. Said design features include, but are not limited to fish design clamp sides, spider design clamp sides, snake design clamp sides, gator design clamp sides, or any design simulating natural predator of bait being used. Clamp sides have cleats on inner clamp surfaces, wherein said clamp sides have curved finger-like extensions on their inner surfaces with said cleats helping clamp side to hold bait. For live bait cleats will make contact with bait. For dead or processed bait, cleats will be larger for firmer hold. For artificial bait application, said cleats can be larger to hold said artificial bait firmer and more securely. Clamp can be added to hooks of beetle-spins or any bait wherein an artificial bait is attached. Artificial bait is not stabbed or pierced with barb end of hook, it's just simply clamped on just like other bait types. Design features, such as but not limited to a skirt can be incorporated to said hook and clamp. Position of clamp on fishhook is dependent on the application. For live, dead, or processed bait the clamp is positioned closer to barb end of hook or curved end of hook. For artificial bait, such as, but not limited to, an artificial worm, the clamp should be positioned on proximal or upper end of hook shank. If a bait such as an earthworm is used, a plurality of clamps can be positioned on fishhook. This design feature of multiple clamps, one on the hook's shank and one on the hook's curved or barbed end, will allow attachment of said earthworm on more than one site on worm's body. No longer will earthworm, or any bait attached to a fishhook need to be intentionally stabbed or pierced with said hook's barbed end, it will simply be clamped on easily, safely, quickly, securely, and naturally. Bait is not shocked, instantly killed, or compromised using the present invention and guts and disease from bait don't squirt everywhere. Some further advantages are:

- to provide a method of baiting a fishhook, wherein said method decreases the chances of accidentally stabbing self with hook while applying bait;
- to provide a method of baiting a fishhook, which will end the old or present method of stabbing bait, thereby increasing one's fishing enjoyment especially for the blind, handicapped, those repulsed by stabbing bait with barb end of hook, or those prohibited from baiting their hook due to inexperience or age such as young kids;
- to provide not only enjoyment to those fishermen or women, but a means of attaching bait for those prohibited by their handicaps from performing the minor surgery required using the old stab method;
- to provide a method and means of attaching bait to one's fishhook, wherein bait is more securely attached than stab method allows;
- to provide brand new design features for any application wherein bait is attached to fishhook;
- to provide clamps attached to hooks already or clamps can be incorporated to fishhook by user and sold separate from hook;

Although the description above contains many specificities, these should not be construed as limiting the scope of the invention, but as merely providing illustrations of some of the presently preferred embodiments of this invention. For example, the hook and clamp combination can have different colors, shapes, sizes, and made from various materials depending on the application. Thus the scope of the invention should be determined by the appended claims and their legal equivalents, rather than by the examples given.

What is claimed is:

1. A fishing lure baitholder for use with a fish hook, said fishing lure baitholder comprising,
    a pair of complementary clasps,
        each of said clasps having an interior portion and an exterior portion;
        an arcuate portion, each arcuate portion of each clasp comprising a plurality of elongated bait engaging members having a plurality of raised cleats along an inner surface of each elongated bait engaging member for surrounding and holding bait without impaling said bait;
        a handle portion extending from each arcuate portion;
        complementary hinge member portions extending from the interior portion of each clasp and being intermediate the arcuate portion and the handle portion, each hinge member portion having an aperture therein;
    a biasing member aligned along said hinge member portions and between the interior portion of each clasp, said biasing member urging the handle portions to diverge and urging the arcuate portions to converge;
    the complementary clasps being joined together by a hinge, said hinge being formed such that the complementary hinge member portions of each clasp being overlapped, the apertures of each hinge member portion being aligned and the fish hook being insertable through the aligned apertures of the hinge member portions forming a hinge shaft upon which the hinge pivots;
    wherein the handle portions being pressed together, the arcuate portions open allowing bait to be placed therebetween, and the handle portions being released, the biasing member maintaining the arcuate portions in a closed position, thus retaining bait between the converging arcuate portions of each clasp without the bait being impaled.

2. A fishing lure baitholder according to claim 1, wherein said fish hook having at least a straight shaft portion and a curved shaft portion, and wherein said fishing lure baitholder engages said fish hook along said straight shaft portion.

3. A fishing lure baitholder according to claim 1, wherein said fish hook having at least a straight shaft portion and a curved shaft portion, and wherein said fishing lure baitholder engages said fish hook along said curved shaft portion.

4. A fishing lure baitholder according to claim 1, wherein said handle portions of each complementary clasp having a shape simulating a creature selected from the group consisting of air creatures, water creatures and land creatures.

5. A fishing lure baitholder according to claim 1, wherein said handle portions of each complementary clasp having a shape simulating a creature selected from the group consisting of fish, snakes, alligators, spiders and dragon flies.

6. A fishing lure baitholder according to claim 1, wherein said biasing member is selected from the group consisting of coil springs and leaf springs.

7. A fishing lure baitholder according to claim 1, wherein said handle portions of said complementary clasps are angled between 20 and 90 degrees with respect to a vertical axis of said fishing lure baitholder providing hydrodynamic movement to the fishing lure baitholder.

8. A fishing lure baitholder for use with a fish hook, said fishing lure baitholder comprising,
    a pair of complementary clasps,
        each of said clasps having an interior portion and an exterior portion;
        an arcuate portion, each arcuate portion of each clasp comprising a plurality of elongated bait engaging members having a plurality of raised cleats along an inner surface of each elongated bait engaging member for surrounding and holding bait without impaling said bait;
        a handle portion extending from each arcuate portion;
        complementary hinge member portions extending from the interior portion of each clasp and being intermediate the arcuate portion and the handle portion, each hinge member portion having an aperture therein;

a biasing member aligned along said hinge member portions and between the interior portion of each clasp, said biasing member urging the handle portions to diverge and urging the arcuate portions to converge;

the complementary clasps being joined together by a hinge, said hinge being formed such that the complementary hinge member portions of each clasp being overlapped, the apertures of each hinge member portion being aligned and a hinge shaft inserted through said aligned apertures of said hinge member portions upon which the hinge pivots;

a hook engagement member being mounted on at least one of said handle portions, said hook engagement member having an aperture for insertion of the fish hook to retain the fishing lure baitholder on the fish hook;

wherein the handle portions being pressed together, the arcuate portions open allowing bait to be placed therebetween, and the handle portions being released, the biasing member maintaining the arcuate portions in a closed position, thus retaining bait between the converging arcuate portions of each clasp without the bait being impaled.

9. A fishing lure baitholder according to claim 8, wherein said fish hook having at least a straight shaft portion and a curved shaft portion, and wherein said fishing lure baitholder engages said fish hook along said straight shaft portion.

10. A fishing lure baitholder according to claim 8, wherein said fish hook having at least a straight shaft portion and a curved shaft portion, and wherein said fishing lure baitholder engages said fish hook along said curved shaft portion.

11. A fishing lure baitholder according to claim 8, wherein said handle portions of each complementary clasp having a shape simulating a creature selected from the group consisting of air creatures, water creatures and land creatures.

12. A fishing lure baitholder according to claim 8, wherein said handle portions of each complementary clasp having a shape simulating a creature selected from the group consisting of fish, snakes, alligators, spiders and dragon flies.

13. A fishing lure baitholder according to claim 8, wherein said biasing member is selected from the group consisting of coil springs and leaf springs.

14. A fishing lure baitholder according to claim 8, wherein said handle portions of said complementary clasps are angled between 20 and 90 degrees with respect to a vertical axis of said fishing lure baitholder providing hydrodynamic movement to the fishing lure baitholder.

* * * * *